(12) United States Patent
Walker et al.

(10) Patent No.: US 10,285,159 B2
(45) Date of Patent: May 7, 2019

(54) DIVERSITY ENHANCEMENT IN A MULTIPLE CARRIER SYSTEM

(71) Applicant: QUALCOMM Incorporated, San Diego, CA (US)

(72) Inventors: Gordon Kent Walker, Poway, CA (US); Ralph Akram Gholmieh, San Diego, CA (US); Jun Wang, Poway, CA (US); Xiaoxia Zhang, San Diego, CA (US); Kuo-Chun Lee, San Diego, CA (US); Nagaraju Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 14/531,625

(22) Filed: Nov. 3, 2014

(65) Prior Publication Data

US 2015/0124692 A1    May 7, 2015

Related U.S. Application Data

(60) Provisional application No. 61/900,236, filed on Nov. 5, 2013.

(51) Int. Cl.
*H04W 72/12*    (2009.01)
*H04L 5/00*    (2006.01)
(Continued)

(52) U.S. Cl.
CPC ......... *H04W 72/005* (2013.01); *H04L 5/0012* (2013.01); *H04L 5/0044* (2013.01);
(Continued)

(58) Field of Classification Search
CPC ... H04W 72/044; H04W 72/005; H04W 4/12; H04W 52/0216; H04W 72/04; H04L 5/0007; H04L 5/0012; H04L 27/2601
(Continued)

(56) References Cited

U.S. PATENT DOCUMENTS 8,670,410 B2    3/2014    Luo et al.
8,774,141 B2 *    7/2014    Cai .................. H04L 12/18
                                                               370/338
(Continued)

FOREIGN PATENT DOCUMENTS

CN    102006257 A    4/2011
CN    102870472 A    1/2013
(Continued)

OTHER PUBLICATIONS

M. Kottkamp, "LTE Release 9 Technology Introduction—White Paper", Dec. 2011, Rohde & Schwarz, p. 1-14.*
(Continued)

*Primary Examiner* — Walter J Divito
*Assistant Examiner* — Camquyen Thai
(74) *Attorney, Agent, or Firm* — Norton Rose Fulbright LLP

(57) ABSTRACT

Diversity enhancement for multiple carrier systems is disclosed which includes generation of a multiplexed multicarrier radio frequency (RF) signal having N carriers organized to be accessed at a rate of one carrier access per multicast channel (MCH) scheduling period (MSP) per carrier of the N carriers, thereby requiring N accesses per MSP duration across the N carriers. The method may also include the base station transmitting the RF signal to a user equipment (UE). In other aspects, the diversity enhancements include the UE receiving a multiplexed multicarrier RF signal having N carriers. The UE may access the N carriers by performing one carrier access per MSP per carrier of the N carriers, thereby performing N accesses per MSP duration across the N carriers.

29 Claims, 10 Drawing Sheets

(51) Int. Cl.
  *H04L 27/26* (2006.01)
  *H04L 12/18* (2006.01)
  *H04W 72/00* (2009.01)
  *H04H 20/00* (2009.01)
(52) U.S. Cl.
  CPC ........ *H04L 5/0053* (2013.01); *H04L 12/1881* (2013.01); *H04L 27/263* (2013.01); *H04L 27/2633* (2013.01); *H04H 20/00* (2013.01); *H04H 2201/10* (2013.01); *H04W 72/12* (2013.01)
(58) Field of Classification Search
  USPC ....... 370/311, 312, 338, 343, 345, 347, 350; 455/67.13, 509; 375/131
  See application file for complete search history.

(56) References Cited

U.S. PATENT DOCUMENTS

| | | | |
|---|---|---|---|
| 8,982,743 B2 | 3/2015 | Luo et al. | |
| 9,913,072 B2* | 3/2018 | Busropan | H04W 4/70 |
| 2006/0135075 A1* | 6/2006 | Tee | H04L 5/0007 |
| | | | 455/67.13 |
| 2009/0103649 A1 | 4/2009 | Vare et al. | |
| 2009/0110033 A1 | 4/2009 | Shattil | |
| 2009/0187949 A1 | 7/2009 | Vare et al. | |
| 2010/0165901 A1* | 7/2010 | Kim | H04W 72/005 |
| | | | 370/312 |
| 2010/0173637 A1 | 7/2010 | Damnjanovic et al. | |
| 2010/0333174 A1* | 12/2010 | Broerman | H04L 63/126 |
| | | | 726/3 |
| 2011/0053566 A1* | 3/2011 | Nader | H04W 72/005 |
| | | | 455/414.1 |
| 2011/0080859 A1* | 4/2011 | Phan | H04W 72/005 |
| | | | 370/312 |
| 2011/0235565 A1* | 9/2011 | Wu | H04W 72/005 |
| | | | 370/312 |
| 2012/0044851 A1* | 2/2012 | Wang | H04W 72/005 |
| | | | 370/312 |
| 2012/0140778 A1 | 6/2012 | Wang et al. | |
| 2012/0263089 A1* | 10/2012 | Gupta | H04W 72/005 |
| | | | 370/312 |
| 2012/0314664 A1* | 12/2012 | Johansson | H04W 74/0833 |
| | | | 370/329 |
| 2013/0039255 A1* | 2/2013 | Kim | H04W 72/005 |
| | | | 370/312 |
| 2013/0100873 A1* | 4/2013 | Arnaud | H04L 12/189 |
| | | | 370/312 |

FOREIGN PATENT DOCUMENTS

| | | |
|---|---|---|
| JP | 2012532536 A | 12/2012 |
| JP | 2013502108 A | 1/2013 |
| JP | 2013051706 A | 3/2013 |
| WO | WO-2011143636 A1 | 11/2011 |
| WO | WO-2012037408 A1 | 3/2012 |
| WO | WO-2013020503 A1 | 2/2013 |

OTHER PUBLICATIONS

International Search Report and Written Opinion—PCT/US2014/063797—ISA/EPO—dated Jun. 18, 2015.
Gimenez J. J. et al., "Time-Frequency Slicing for DVB-NGH (Chapter 13)", In: "Next Generation Mobile Broadcasting", Mar. 26, 2013 (Mar. 26, 2013), CRC Press, XP055166304, ISBN: 978-1-43-989866-6, pp. 389-415.
Huschke J. et al., "An Overview of the Cellular Broadcasting Technology eMBMS in LTE (Chapter 8)", In: "Next Generation Mobile Broadcasting", Mar. 26, 2013 (Mar. 26, 2013), CRC Press, XP055166321, ISBN: 978-1-43-989866-6, pp. 223-252 and p. 235-248.
Partial International Search Report—PCT/US2014/063797—ISA/EPO—dated Feb. 9, 2015.

* cited by examiner

Sequential Access

Non-Sequential Access

DIVERSITY ENHANCEMENT IN A MULTIPLE CARRIER SYSTEM

CROSS-REFERENCE TO RELATED APPLICATIONS

This application claims the benefit of U.S. Provisional Patent Application No. 61/900,236, entitled, "DIVERSITY ENHANCEMENT IN A MULTIPLE CARRIER SYSTEM", filed on Nov. 5, 2013, which is expressly incorporated by reference herein in its entirety.

BACKGROUND

Field

Aspects of the present disclosure relate generally to wireless communication systems, and more particularly, to diversity enhancement in a multiple carrier system.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

In some implementations, wireless communication systems may be configured as multiple carrier systems having statistical multiplexing. In such implementations, increasing the cyclic prefix of orthogonal frequency division multiplex (OFDM) symbols allows for a longer channel without self-interference, but increases the required fast Fourier transformation (FFT). One method for avoiding an excessively large FFT is to break a carrier into smaller frequency segments, such as 5 MHz and/or 6 MHz segments, to reduce the FFT size. In this manner, a high bandwidth multiplex may be formed by serially accessing frequency segments, which can allow for more effective statistical multiplexing. In this context, it is desirable to maximize the duration of the outer code in order to maximize capacity. However, while longer diversity increases effectiveness of the outer code, it also increases end to end latency. The present disclosure is directed to providing diversity enhancements in such multiple carrier systems.

SUMMARY

Techniques for time diversity enhancements in multiple carrier systems are described herein.

In an aspect, a method for wireless communication includes generating, by a base station, a multiplexed multicarrier radio frequency (RF) signal having N carriers organized to be accessed at a rate of one carrier access per multicast channel (MCH) scheduling period (MSP) per carrier of the N carriers, thereby requiring N accesses per MSP duration across the N carriers. The method also includes transmitting, by the base station, the RF signal to a user equipment (UE).

In another aspect, an apparatus for wireless communication includes means for generating, by a base station, a multiplexed multicarrier RF signal having N carriers organized to be accessed at a rate of one carrier access per MSP per carrier of the N carriers, thereby requiring N accesses per MSP duration across the N carriers. The apparatus also includes means for transmitting, by the base station, the RF signal to a UE.

In such an aspect of the apparatus, the means for generating the RF signal may include means for organizing the N carriers to be accessed at a rate of one carrier access per 80 milliseconds, 160 milliseconds, 320 milliseconds, 640 milliseconds, 1.28 milliseconds, 2.56 milliseconds, 5.12 milliseconds, or 10.24 milliseconds.

In such an aspect of the apparatus, the means for generating the RF signal may include means for organizing the N carriers such that the MSPs and respective MCH scheduling information (MSI) thereof are staggered in time.

In such an aspect of the apparatus, the means for organizing the N carriers may include means for organizing the N carriers such that an order of multicast transport channels (MTCHs) within each MSP is fixed in relative terms within respective MSP durations thereof.

In such an aspect of the apparatus, the means for organizing the N carriers may include means for organizing the N carriers such that an MSI for one of the N carriers may be inferred from another MSI for another of the N carriers by enforcing scheduling rules based on static time offset across the N carriers between respective MTCHs of the N carriers.

In such an aspect of the apparatus, the means for organizing the N carriers may include means for organizing the N carriers such that positions of non-hopping MTCHs are fixed relative to positions of frequency hopping MTCHs within the respective MSP durations thereof.

In such an aspect of the apparatus, the means for generating the RF signal may include means for organizing the N carriers such that the MSPs and respective MSI thereof are aligned in time.

In such an aspect of the apparatus, the means for generating the RF signal may include means for describing all of the N carriers per carrier in a common MSI.

In such an aspect of the apparatus, the means for organizing the N carriers may include means for organizing the N carriers such that an MSI for one of the N carriers may be inferred from another MSI for another of the N carriers by enforcing scheduling rules based on a static time offset across the N carriers between respective MTCHs of the N carriers.

In such an aspect of the apparatus, the means for organizing the N carriers may include means for rotating an order of MTCHs within a given MSP.

In such an aspect of the apparatus, the means for organizing the N carriers may include means for organizing the N carriers such that positions of non-hopping MTCHs are fixed relative to positions of frequency hopping MTCHs within respective MSPs thereof.

In such an aspect of the apparatus, the means for generating the RF signal may include means for allocating a maximum access time to one or more MTCHs.

In such an aspect of the apparatus, the means for generating the RF signal may include means for scheduling a collection of MTCHs to all be concurrently accessible.

In such an aspect of the apparatus, the means for scheduling the collection of MTCHS may include means for scheduling the MTCHs to be adjacent in time in an ordering of the MTCHs within an MSP.

In such an aspect of the apparatus, the means for scheduling the collection of MTCHs may include means for scheduling the collection of MTCHs such that access on one of the N carriers ends a predefined amount of time before the scheduling requires access on another of the N carriers.

In such an aspect of the apparatus, the means for generating the RF signal may include means for scheduling access of adjacent frequency segments to be at least partly non-sequential so as to reduce temporal correlation of adjacent frequencies by minimizing access of adjacent frequencies by the UE.

In such an aspect of the apparatus, the means for generating the RF signal may include means for assigning unicast traffic to frames containing broadcast subframes containing currently accessed broadcast services.

In such an aspect of the apparatus, the means for generating the RF signal may include means for maintaining a single MTCH temporary mobile group identifier (TMGI) across the N carriers.

In such an aspect of the apparatus, the means for generating the RF signal may include means for maintaining MTCH TMGIs that are unique per carrier, and that are combined by one or more upper layers.

In such an aspect of the apparatus, the means for generating the RF signal may include means for scheduling the MSPs and respective MSI thereof according to a rule ensuring that a single device modem resource never has to exceed total allowable reception time, $T_r$, calculated according to the equation, $T_r=(MSP-MSI)-N*Transition$ Time per carrier, where MSP represents duration of the MSP, and MSI represents time required to read the MCH scheduling information.

In such an aspect of the apparatus, the means for generating the RF signal may include means for scheduling MTCHs during the MSPs and respective MSI thereof according to a rule ensuring that total elapsed time for a desired collection of MTCHs on any of the N carriers does not exceed a threshold, $T_c$, calculated as follows the equation, $T_c=(MSP-MSI)/N-Transition$ Time, where MSP represents duration of the MSP, and MSI represents time required to read the MCH scheduling information, the rule further ensuring that the total elapsed time does not overlap itself in a collection sense on another of the N carriers, including the transition time.

In such an aspect of the apparatus, the means for generating the RF signal may include means for scheduling MTCHs such that defined services are accessible by a single modem resource.

In such an aspect of the apparatus, the means for generating the RF signal may include means for scheduling MTCHs according to a minimum requirement that all MTCHs in one service meet all scheduling restrictions.

In another aspect, a computer-readable medium having instruction recorded thereon. The instructions include code for causing one or more computers to generate, by a base station, a multiplexed multicarrier RF signal having N carriers organized to be accessed at a rate of one carrier access per MSP per carrier of the N carriers, thereby requiring N accesses per MSP duration across the N carriers. The instructions also include code for causing the one or more computers to transmit, by the base station, the RF signal to a UE.

In such an aspect of the computer-readable medium, the code for causing the one or more computers to generate the RF signal may include code for causing the one or more computers to organize the N carriers to be accessed at a rate of one carrier access per one 80 milliseconds, 160 milliseconds, 320 milliseconds, 640 milliseconds, 1.28 milliseconds, 2.56 milliseconds, 5.12 milliseconds, or 10.24 milliseconds.

In such an aspect of the computer-readable medium, the code for causing the one or more computers to generate the RF signal may include code for causing the one or more computers to organize the N carriers such that the MSPs and respective MSI thereof are staggered in time.

In such an aspect of the computer-readable medium, the code for causing the one or more computers to organize the N carriers may include code for causing the one or more computers to organize the N carriers such that an order of MTCHs within each MSP is fixed in relative terms within respective MSP durations thereof.

In such an aspect of the computer-readable medium, the code for causing the one or more computers to organize the N carriers may include code for causing the one or more computers to organize the N carriers such that an MSI for one of the N carriers may be inferred from another MSI for another of the N carriers by enforcing scheduling rules based on static time offset across the N carriers between respective MTCHs of the N carriers.

In such an aspect of the computer-readable medium, the code for causing the one or more computers to organize the N carriers may include code for causing the one or more computers to organize the N carriers such that positions of non-hopping MTCHs are fixed relative to positions of frequency hopping MTCHs within the respective MSP durations thereof.

In such an aspect of the computer-readable medium, the code for causing the one or more computers to generate the RF signal may include code for causing the one or more computers to organize the N carriers such that the MSPs and respective MSI thereof are aligned in time.

In such an aspect of the computer-readable medium, the code for causing the one or more computers to generate the RF signal may include code for causing the one or more computers to describe all of the N carriers per carrier in a common MSI.

In such an aspect of the computer-readable medium, the code for causing the one or more computers to organize the N carriers may include code for causing the one or more computers to organize the N carriers such that an MSI for one of the N carriers may be inferred from another MSI for another of the N carriers by enforcing scheduling rules based on a static time offset across the N carriers between respective MTCHs of the N carriers.

In such an aspect of the computer-readable medium, the code for causing the one or more computers to organize the N carriers may include code for causing the one or more computers to rotate an order of MTCHs within a given MSP.

In such an aspect of the computer-readable medium, the code for causing the one or more computers to organize the N carriers may include code for causing the one or more computers to organize the N carriers such that positions of non-hopping MTCHs are fixed relative to positions of frequency hopping MTCHs within respective MSPs thereof.

In such an aspect of the computer-readable medium, the code for causing the one or more computers to generate the RF signal may include code for causing the one or more computers to allocate a maximum access time to one or more MTCHs.

In such an aspect of the computer-readable medium, the code for causing the one or more computers to generate the RF signal may include code for causing the one or more computers to schedule a collection of MTCHs to all be concurrently accessible.

In such an aspect of the computer-readable medium, the code for causing the one or more computers to schedule the collection of MTCHS may include code for causing the one or more computers to schedule the MTCHs to be adjacent in time in an ordering of the MTCHs within an MSP.

In such an aspect of the computer-readable medium, the code for causing the one or more computers to schedule the collection of MTCHs may include code for causing the one or more computers to schedule the collection of MTCHs such that access on one of the N carriers ends a predefined amount of time before the scheduling requires access on another of the N carriers.

In such an aspect of the computer-readable medium, the code for causing the one or more computers to generate the RF signal may include code for causing the one or more computers to schedule access of adjacent frequency segments to be at least partly non-sequential so as to reduce temporal correlation of adjacent frequencies by minimizing access of adjacent frequencies by the UE.

In such an aspect of the computer-readable medium, the code for causing the one or more computers to generate the RF signal may include code for causing the one or more computers to assign unicast traffic to frames containing broadcast subframes containing currently accessed broadcast services.

In such an aspect of the computer-readable medium, the code for causing the one or more computers to generate the RF signal may include code for causing the one or more computers to maintain a single MTCH TMGI across the N carriers.

In such an aspect of the computer-readable medium, the code for causing the one or more computers to generate the RF signal may include code for causing the one or more computers to maintain MTCH TMGIs that are unique per carrier, and that are combined by one or more upper layers.

In such an aspect of the computer-readable medium, the code for causing the one or more computers to generate the RF signal may include code for causing the one or more computers to schedule the MSPs and respective MSI thereof according to a rule ensuring that a single device modem resource never has to exceed total allowable reception time, $T_r$, calculated according to the equation, $T_r=(MSP-MSI)-N*$Transition Time per carrier, where MSP represents duration of the MSP, and MSI represents time required to read the MCH scheduling information.

In such an aspect of the computer-readable medium, the code for causing the one or more computers to generate the RF signal may include code for causing the one or more computers to schedule MTCHs during the MSPs and respective MSI thereof according to a rule ensuring that total elapsed time for a desired collection of MTCHs on any of the N carriers does not exceed a threshold, $T_c$, calculated as follows the equation, $T_c=(MSP-MSI)/N-$Transition Time, where MSP represents duration of the MSP, and MSI represents time required to read the MCH scheduling information, the rule further ensuring that the total elapsed time does not overlap itself in a collection sense on another of the N carriers, including the transition time.

In such an aspect of the computer-readable medium, the code for causing the one or more computers to generate the RF signal may include code for causing the one or more computers to schedule MTCHs such that defined services are accessible by a single modem resource.

In such an aspect of the computer-readable medium, the code for causing the one or more computers to generate the RF signal may include code for causing the one or more computers to schedule MTCHs according to a minimum requirement that all MTCHs in one service meet all scheduling restrictions.

In another aspect, a base station includes at least one processor, and a memory coupled to the at least one processor. The at least one processor is configured to generate, by a base station, a multiplexed multicarrier RF signal having N carriers organized to be accessed at a rate of one carrier access per MSP per carrier of the N carriers, thereby requiring N accesses per MSP duration across the N carriers. The at least one processor is also configured to transmit, by the base station, the RF signal to a UE.

In such an aspect of the base station, the configuration of the at least one processor to generate the RF signal may include configuration to organize the N carriers to be accessed at a rate of one carrier access per one 80 milliseconds, 160 milliseconds, 320 milliseconds, 640 milliseconds, 1.28 milliseconds, 2.56 milliseconds, 5.12 milliseconds, or 10.24 milliseconds.

In such an aspect of the base station, the configuration of the at least one processor to generate the RF signal may include configuration to organize the N carriers such that the MSPs and respective MSI thereof are staggered in time.

In such an aspect of the base station, the configuration of the at least one processor to organize the N carriers may include configuration to organize the N carriers such that an order of MTCHs within each MSP is fixed in relative terms within respective MSP durations thereof.

In such an aspect of the base station, the configuration of the at least one processor to organize the N carriers may include configuration to organize the N carriers such that an MSI for one of the N carriers may be inferred from another MSI for another of the N carriers by enforcing scheduling rules based on static time offset across the N carriers between respective MTCHs of the N carriers.

In such an aspect of the base station, the configuration of the at least one processor to organize the N carriers may include configuration to organize the N carriers such that positions of non-hopping MTCHs are fixed relative to positions of frequency hopping MTCHs within the respective MSP durations thereof.

In such an aspect of the base station, the configuration of the at least one processor to generate the RF signal may include configuration to organize the N carriers such that the MSPs and respective MSI thereof are aligned in time.

In such an aspect of the base station, the configuration of the at least one processor to generate the RF signal may include configuration to describe all of the N carriers per carrier in a common MSI.

In such an aspect of the base station, the configuration of the at least one processor to organize the N carriers may include configuration to organize the N carriers such that an MSI for one of the N carriers may be inferred from another MSI for another of the N carriers by enforcing scheduling rules based on a static time offset across the N carriers between respective MTCHs of the N carriers.

In such an aspect of the base station, the configuration of the at least one processor to organize the N carriers may include configuration to rotate an order of MTCHs within a given MSP.

In such an aspect of the base station, the configuration of the at least one processor to organize the N carriers may include configuration to organize the N carriers such that positions of non-hopping MTCHs are fixed relative to positions of frequency hopping MTCHs within respective MSPs thereof.

In such an aspect of the base station, the configuration of the at least one processor to generate the RF signal may include configuration to allocate a maximum access time to one or more MTCHs.

In such an aspect of the base station, the configuration of the at least one processor to generate the RF signal may include configuration to schedule a collection of MTCHs to all be concurrently accessible.

In such an aspect of the base station, the configuration of the at least one processor to schedule the collection of MTCHS may include configuration to schedule the MTCHs to be adjacent in time in an ordering of the MTCHs within an MSP.

In such an aspect of the base station, the configuration of the at least one processor to schedule the collection of MTCHs may include configuration to schedule the collection of MTCHs such that access on one of the N carriers ends a predefined amount of time before the scheduling requires access on another of the N carriers.

In such an aspect of the base station, the configuration of the at least one processor to generate the RF signal may include configuration to schedule access of adjacent frequency segments to be at least partly non-sequential so as to reduce temporal correlation of adjacent frequencies by minimizing access of adjacent frequencies by the UE.

In such an aspect of the base station, the configuration of the at least one processor to generate the RF signal may include configuration to assign unicast traffic to frames containing broadcast subframes containing currently accessed broadcast services.

In such an aspect of the base station, the configuration of the at least one processor to generate the RF signal may include configuration to maintain a single MTCH TMGI across the N carriers.

In such an aspect of the base station, the configuration of the at least one processor to generate the RF signal may include configuration to maintain MTCH TMGIs that are unique per carrier, and that are combined by one or more upper layers.

In such an aspect of the base station, the configuration of the at least one processor to generate the RF signal may include configuration to schedule the MSPs and respective MSI thereof according to a rule ensuring that a single device modem resource never has to exceed total allowable reception time, $T_r$, calculated according to the equation, $T_r = (MSP-MSI)-N*Transition\ Time$ per carrier, where MSP represents duration of the MSP, and MSI represents time required to read the MCH scheduling information.

In such an aspect of the base station, the configuration of the at least one processor to generate the RF signal may include configuration to schedule MTCHs during the MSPs and respective MSI thereof according to a rule ensuring that total elapsed time for a desired collection of MTCHs on any of the N carriers does not exceed a threshold, $T_c$, calculated as follows the equation, $T_c = (MSP-MSI)/N-Transition\ Time$, where MSP represents duration of the MSP, and MSI represents time required to read the MCH scheduling information, the rule further ensuring that the total elapsed time does not overlap itself in a collection sense on another of the N carriers, including the transition time.

In such an aspect of the base station, the configuration of the at least one processor to generate the RF signal may include configuration to schedule MTCHs such that defined services are accessible by a single modem resource.

In such an aspect of the base station, the configuration of the at least one processor to generate the RF signal may include configuration to schedule MTCHs according to a minimum requirement that all MTCHs in one service meet all scheduling restrictions.

In another other aspect, a method of wireless communication includes receiving, by a UE, a multiplexed multicarrier RF signal having N carriers. The method may further include accessing, by the UE, the N carriers by performing one carrier access per MSP per carrier of the N carriers, thereby performing N accesses per MSP duration across the N carriers.

In another aspect, an apparatus for wireless communication includes means for receiving, by a UE, a multiplexed multicarrier RF signal having N carriers. The apparatus also includes means for accessing, by the UE, the N carriers by performing one carrier access per MSP per carrier of the N carriers, thereby performing N accesses per MSP duration across the N carriers.

In another aspect, a computer program product includes a computer-readable medium having instruction recorded thereon. The instructions include code for causing one or more computers to receive, by a UE, a multiplexed multicarrier RF signal having N carriers. The instructions also include code for causing the one or more computers to access, by the UE, the N carriers by performing one carrier access per MSP per carrier of the N carriers, thereby performing N accesses per MSP duration across the N carriers.

In another aspect, a UE includes at least one processor, and a memory coupled to the at least one processor. The at least one processor is configured to receive, by a UE, a multiplexed multicarrier RF signal having N carriers. The at least one processor is also configured to access, by the UE, the N carriers by performing one carrier access per MSP per carrier of the N carriers, thereby performing N accesses per MSP duration across the N carriers.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
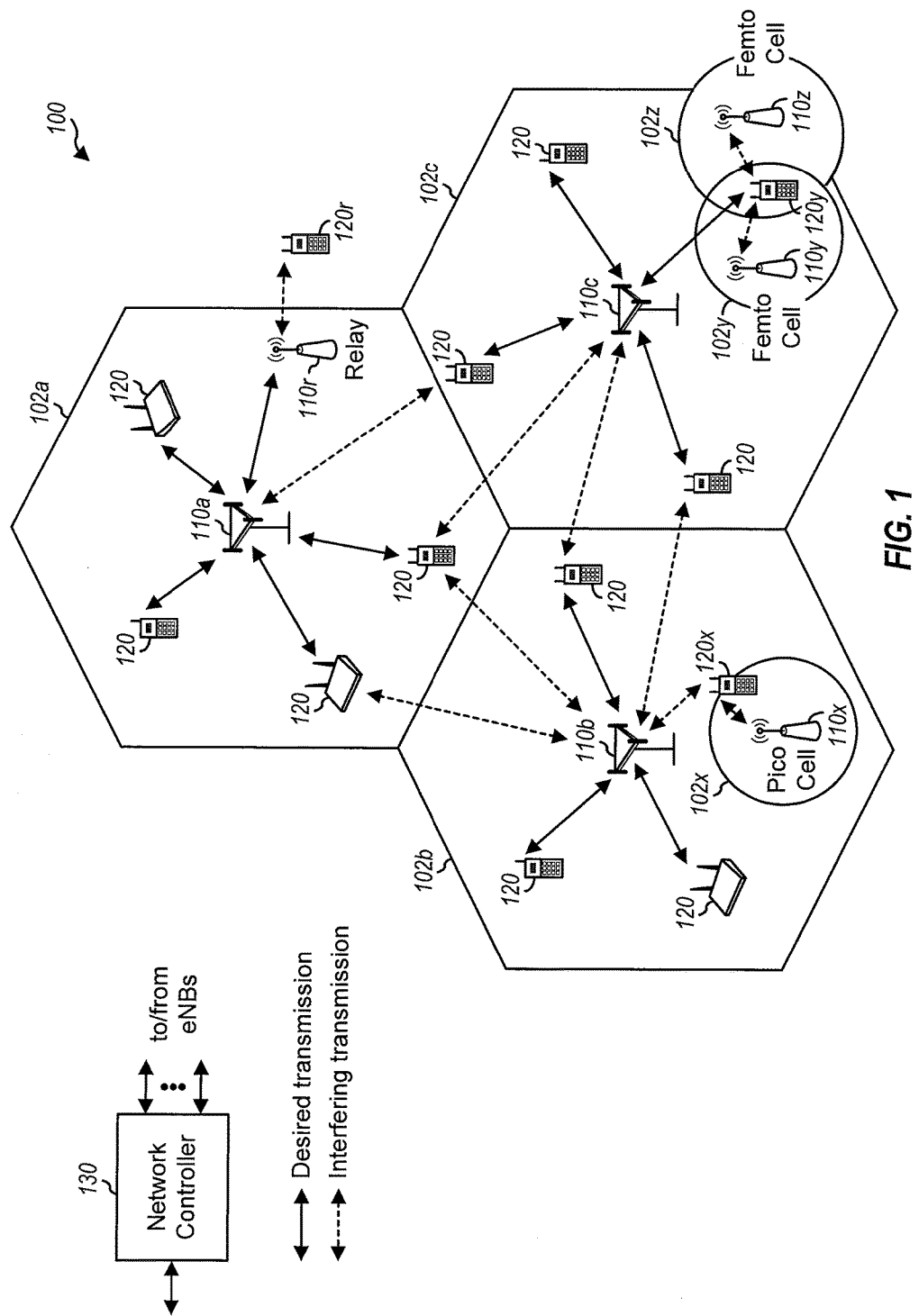
FIG. 1 is a block diagram illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x serving a UE 120x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a smart phone, a handheld device, a laptop computer, a tablet, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
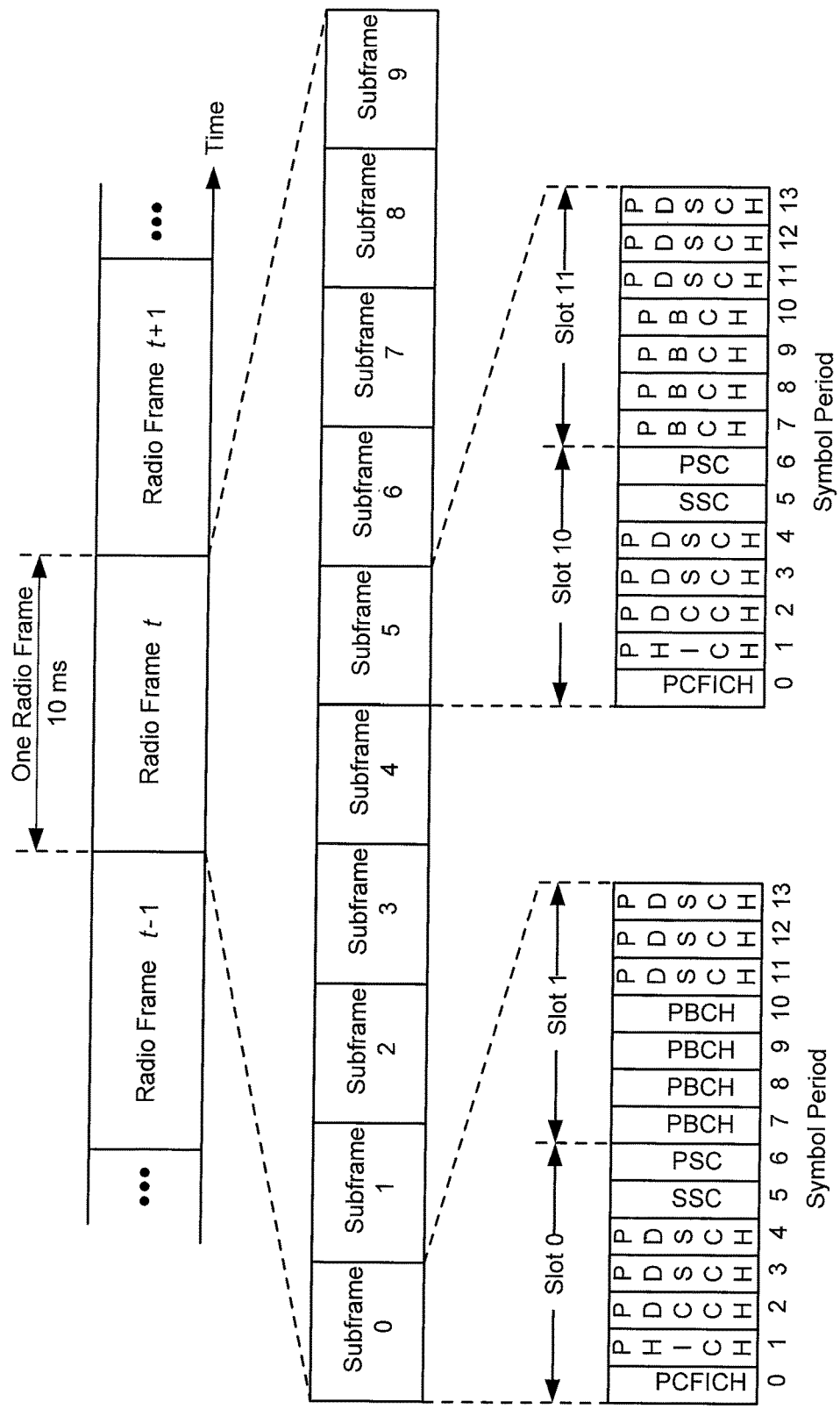
FIG. 2 is a block diagram illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
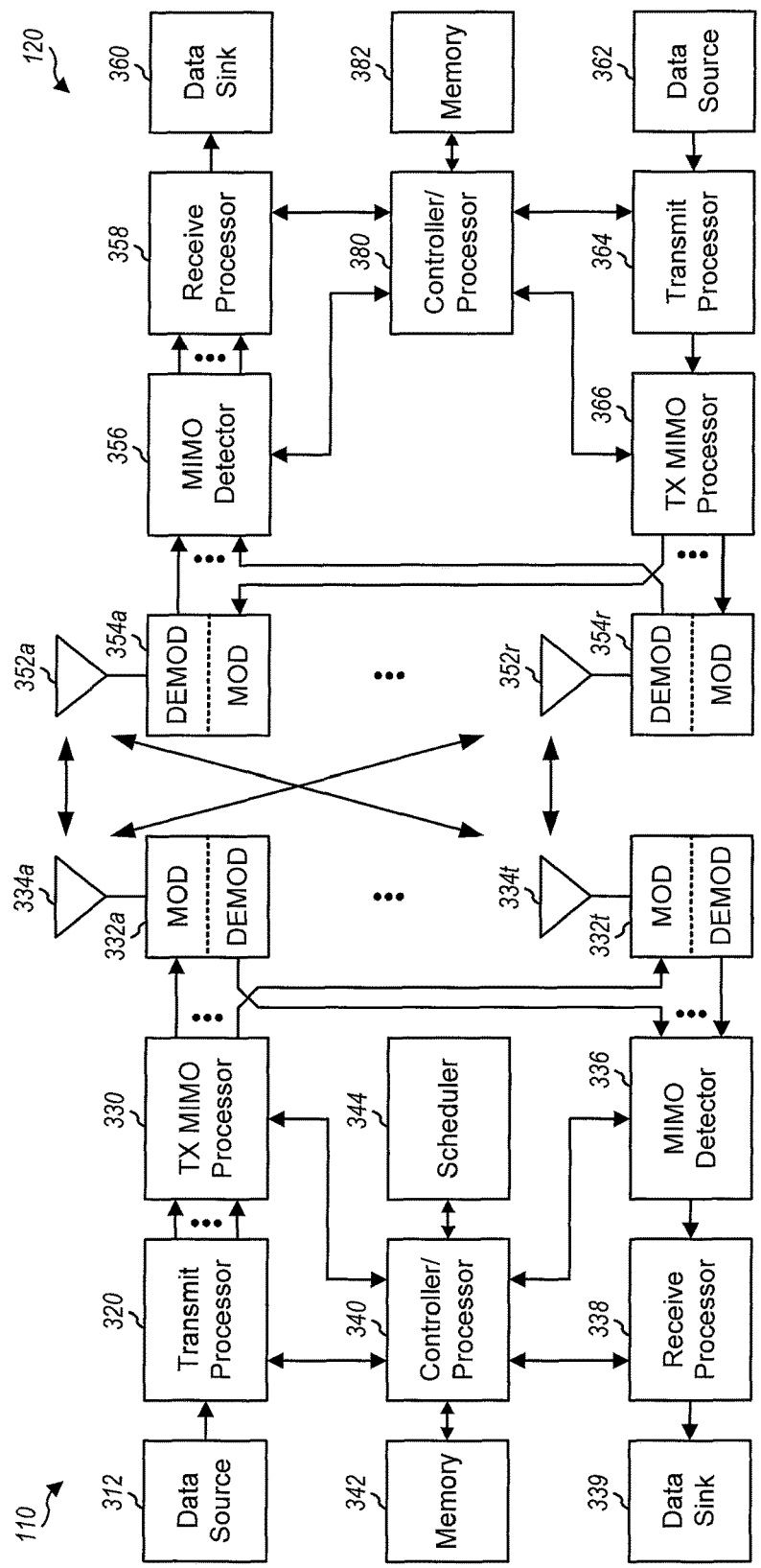
FIG. 3 is a block diagram illustrating a design of an eNodeB and a UE configured according to one aspect of the present disclosure.

FIG. 3 shows a block diagram of a design of an eNodeB 110 and a UE 120, which may be one of the eNodeBs and one of the UEs in FIG. 1. For a restricted association scenario, the eNodeB 110 may be the macro eNodeB 110c in FIG. 1, and the UE 120 may be the UE 120y. The eNodeB 110 may be equipped with antennas 334a through 334t, and the UE 120 may be equipped with antennas 352a through 352r.

At the eNodeB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNodeB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a transmit MIMO processor 366 if applicable, further processed by the modulators 354a through 354r (e.g., for SC-FDM, etc.), and transmitted to the eNodeB 110. At the eNodeB 110, the uplink signals from the UE 120 may be received by the antennas 334, processed by the demodulators 332a through 332t, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNodeB 110 and the UE 120, respectively. The processor 340 and/or other processors and modules at the eNodeB 110 may perform or direct the execution of various processes for the techniques described herein. The processor 380 and/or other processors and modules at the UE 120 may also perform or direct the execution of the functional blocks illustrated in FIGS. 4-8, and/or other processes for the techniques described herein. The memories 342 and 382 may store data and program codes for the eNodeB 110 and the UE 120, respectively. A scheduler 344 may schedule UEs for data transmission on the downlink and/or uplink.

As previously mentioned, in some implementations, wireless communication systems may be configured as multiple carrier systems having statistical multiplexing. In such implementations, increasing the cyclic prefix of OFDM symbols allows for a longer channel without self-interference, but increases the required fast Fourier transformation (FFT). As shown in Table 1, row 2 provides information relating to defined LTE eMBMS modes of operation, whereas other rows, such as row 6, provide examples of reasonable extensions of eMBMS. The frame organization may be impacted by the lengthening of the cyclic prefix. For example, the specific frame organization for mixed mode of operation detailed above with respect to FIG. 2 may be applicable to row one Table 1, and it is envisioned that other frame organizations may be utilized for other rows of Table 1. As additionally shown in Table 1, the FFT may become excessively large at 20 MHz for Advanced Television Systems Committee (ATSC) 3.0 use cases that extend the cyclic prefix an amount necessary to accomplish rooftop communications.

TABLE 1

| # | Number of Symbols/ Subframe | Duration (msec) | Fraction CP (%) | CP (µs) | Per RB | Carrier Spacing (Hz) | FFT for 5 MHz* | FFT for 6 MHz* | FFT for 20 MHz* |
|---|---|---|---|---|---|---|---|---|---|
| 1 | 12  | 0.08 | 20.0% | 16.7  | 12  | 15000 | 512   | 512   | 2048  |
| 2 | 6   | 0.17 | 20.0% | 33.3  | 24  | 7500  | 1024  | 1024  | 4096  |
| 3 | 3   | 0.33 | 20.0% | 66.7  | 48  | 3750  | 2048  | 2048  | 8192  |
| 4 | 2   | 0.50 | 20.0% | 100.0 | 72  | 2500  | 4096  | 4096  | 16384 |
| 5 | 1   | 1.00 | 20.0% | 200.0 | 144 | 1250  | 8192  | 8192  | 32768 |
| 6 | 1/2 | 2.00 | 20.0% | 400.0 | 288 | 625   | 16384 | 16384 | 65536 |

Figure 4:
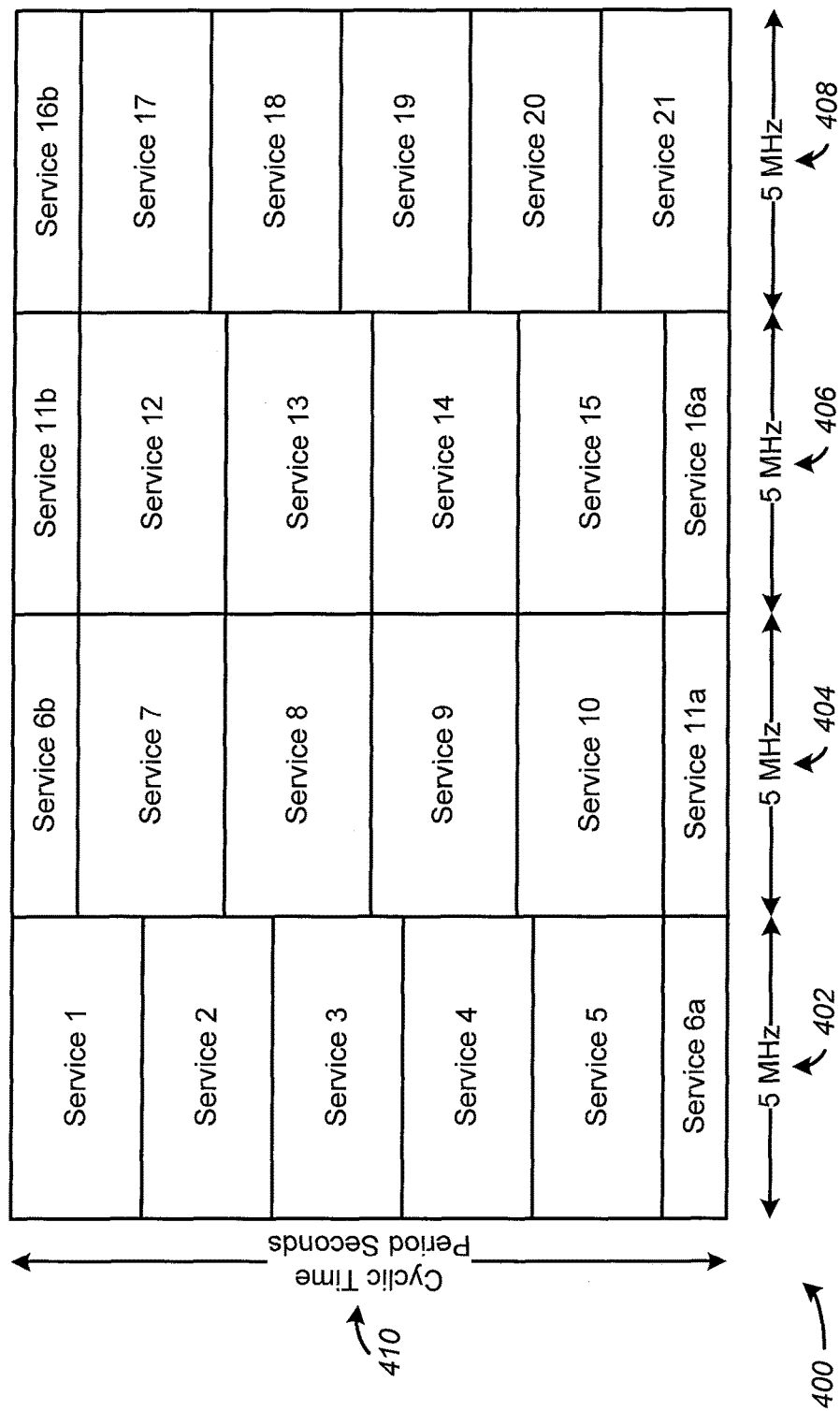
FIG. 4 is a graphical illustration depicting multiple services distributed over multiple frequency segments in a multiple carrier radio frequency RF signal.

As shown in FIG. 4, one method for avoiding an excessively large FFT is to break a carrier into smaller frequency segments, such as 5 MHz and/or 6 MHz segments, to reduce the FFT size. In this manner, a high bandwidth multiplex may be formed by serially accessing frequency segments, which may allow for more effective statistical multiplexing. In this context, it may be desirable to maximize the duration of the outer code in order to maximize capacity. However, while longer diversity increases effectiveness of the outer code, it also increases end to end latency. The present disclosure is directed to providing diversity enhancements in such multiple carrier systems.

In order to achieve good statistical multiplexing efficiency, it may be desirable to have a large number of services in the multiplex. For example, it may be undesirable to have only five services in the multiplex. Additionally, while having ten services in the multiplex may be better, having twenty or more services may be more desirable.

In order to limit the growth of the FFT beyond 16K, either 5 MHz or 6 MHz segments may be used sequentially rather than at the maximum 20 MHz normally specified. For example, a statistically multiplexed RF signal 400 may be generated to have four adjacent carriers 402, 404, 46, and 408, each formed of 5 MHz segments. Twenty or more services may be distributed across these carriers within a cyclic time period 410. It is envisioned that each of the individual carriers may be of a standalone format, and that a single modem resource may be able to support the entire ensemble.

With the arrangement depicted in FIG. 4, there may be some loss of frequency diversity. However, this arrangement may achieve substantial reduction in the maximum FFT. In this example, the FFT may be reduced from 64K to 16K. As explained in greater detail below, the RF signal of FIG. 4 may have novel diversity enhancements as disclosed herein.

Figure 5:
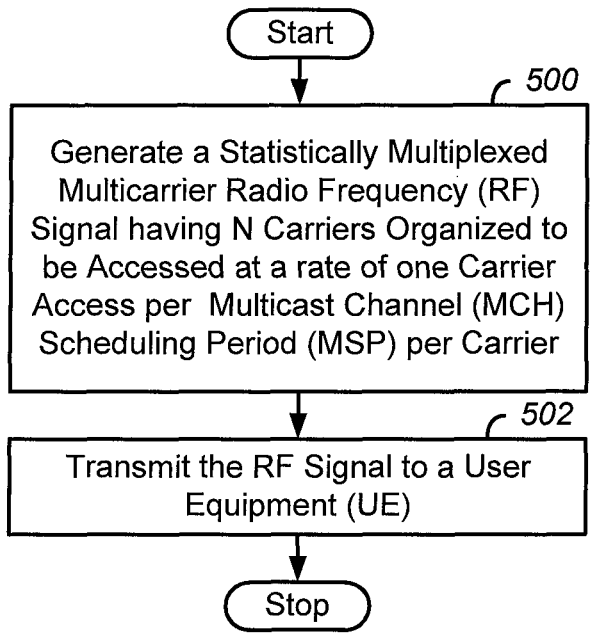
FIG. 5 is a functional block diagram conceptually illustrating example blocks executed by a base station to implement one or more aspects of the present disclosure.

FIG. 5 illustrates example blocks executed by a base station, such as eNodeB 110 (see FIG. 3), to implement one or more aspects of the present disclosure. For example, starting at block 500, the base station may generate a statistically multiplexed RF signal having N carriers organized to be accessed at a rate of one carrier access per multicast channel (MCH) scheduling period (MSP) per carrier. Operations carried out at block 500 are described in greater detail below with reference to FIGS. 7-14. Processing may proceed from block 500 to block 502. At block 502 the base station may transmit the RF signal to one or more UEs, such as UE 120 (see FIG. 3).

Figure 6:
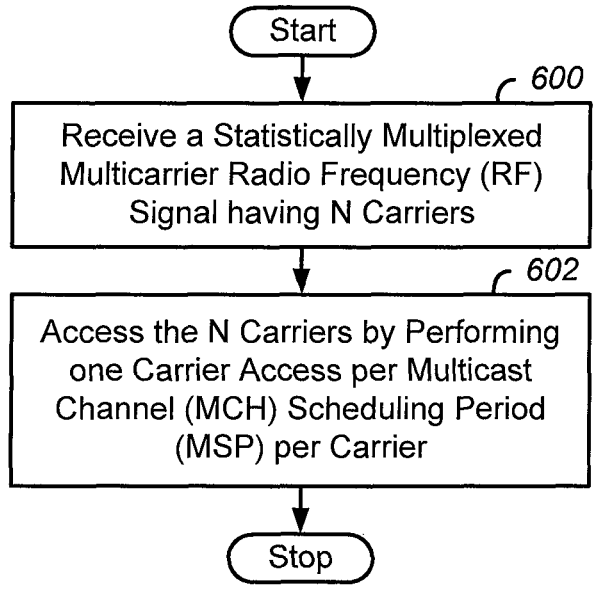
FIG. 6 is a functional block diagram conceptually illustrating example blocks executed by a user equipment to implement one or more aspects of the present disclosure.

FIG. 6 illustrates example blocks executed by a user equipment, such as UE 120 (see FIG. 3), to implement one or more aspects of the present disclosure. For example, starting at block 600, the UE may receive a statistically multiplexed RF signal having N carriers. At block 600, it is envisioned that the UE may receive the RF signal from a base station, such as eNodeB 110 (see FIG. 3). Processing may proceed from block 600 to block 602. At block 602, the UE may access the N carriers by performing one carrier access per MSP per carrier. Operations carried out at block 602 are described in greater detail below with reference to FIGS. 7-14.

Figure 7:
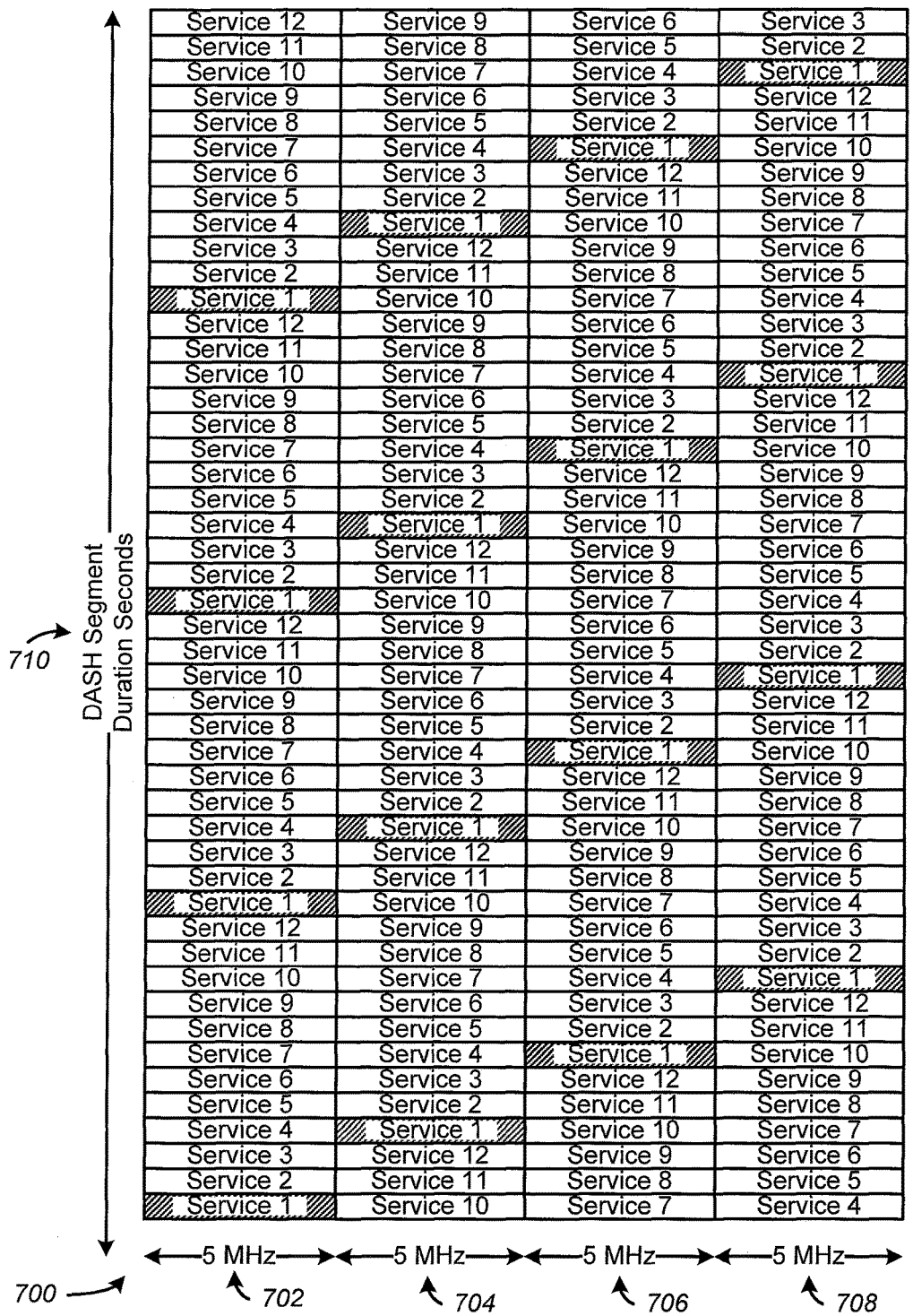
FIG. 7 is a is a graphical illustration depicting multiple services distributed over multiple frequency segments in a multiple carrier radio frequency RF signal with diversity enhancement according to one or more aspects of the present disclosure.

FIG. 7 depicts multiple services distributed over multiple frequency segments 702, 704, 706, and 708 in a multiple carrier radio frequency RF signal 700 with diversity enhancement according to one or more aspects of the present disclosure. For example, instead of switching frequency segment about once per dynamic adaptive streaming over hypertext transport protocol (HTTP) (DASH) segment 710, the rate of the frequency segment switching may be increased so that the access is once per MSP per carrier. At 700 MHz, decorrelation time is 0.5 seconds for 2 Hz Doppler. Therefore, it is envisioned that a base station may schedule, and a UE may perform, one carrier access per 0.320 seconds. It is envisioned that, in alternative arrangements, and depending on the decorrelation time, the N carriers may be accessed at a rate of one carrier access per one of: 80 milliseconds; 160 milliseconds; 320 milliseconds; 640 milliseconds; 1.28 milliseconds; 2.56 milliseconds; 5.12 milliseconds; or 10.24 milliseconds. In the four carrier example depicted in FIG. 7, the same MSP duration may be maintained, but there may be four accesses per MSP duration, one in each carrier. Accordingly, the allocated subframes per MTCH/carrier may be equal to 1/N, which equals ¼ in the case of 4 carriers. It is envisioned that the organization shown in FIG. 7 may be achieved with a time aligned MSP method described in greater detail below with respect to FIG. 9. A single sequence from service 1 through service 12 may correspond to an MSP duration, and a single service may be comprised of multiple MTCHs and their associated temporary mobile group identifiers (TMGIs). This example may achieve eight seconds of diversity for a two second segment, as the carrier frequencies may be decorrelated. Although this increase in diversity may consume more power, the power consumption may be the same as in eight second diversity, due to making the same number of accesses as in eight second diversity.

Figure 8:
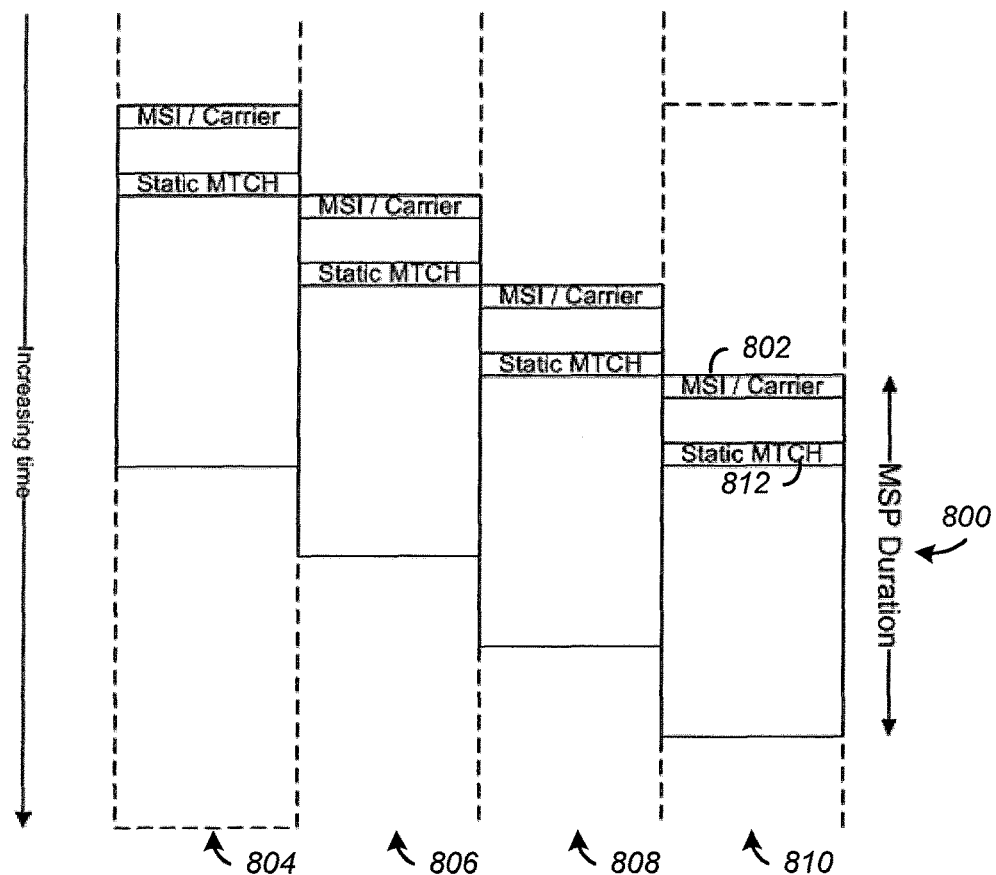
FIG. 8 is a graphical illustration depicting an organization of multiple carriers such that multicast channel (MCH) scheduling periods (MSPs) and respective MCH scheduling information (MSI) thereof are staggered in time in accordance with one aspect of the present disclosure.

There are a couple of different ways to organize the respective MSPs across the N carriers. FIG. 8 depicts an organization of multiple carriers such that MSPs 800 and respective MCH scheduling information (MSI) 802 thereof are staggered in time across the N carriers 804-810 in accordance with one aspect of the present disclosure. With the individual MSPs and MSIs staggered in time, the order of the individual MTCHs 812 within each MSP 800 may be fixed in relative terms. A benefit of this organization may be simplified organization of MTCHs 812. However, such an organization may involve reading the MSI 802 individually on every carrier 804-810. Such an implementation may be less desirable, because the MSI read may block access to data on another carrier. Fixing this loss of capacity with forward error coding (FEC) may result in no improvement in capacity. Therefore, another way to address this loss of capacity may include implementing a static time offset between carriers' respective MTCHs 812 across the carriers 804-810 so that MSIs for all carriers may be inferred from an MSI of one carrier. However, this approach may suffer from decreased flexibility in scheduling.

Figure 9:
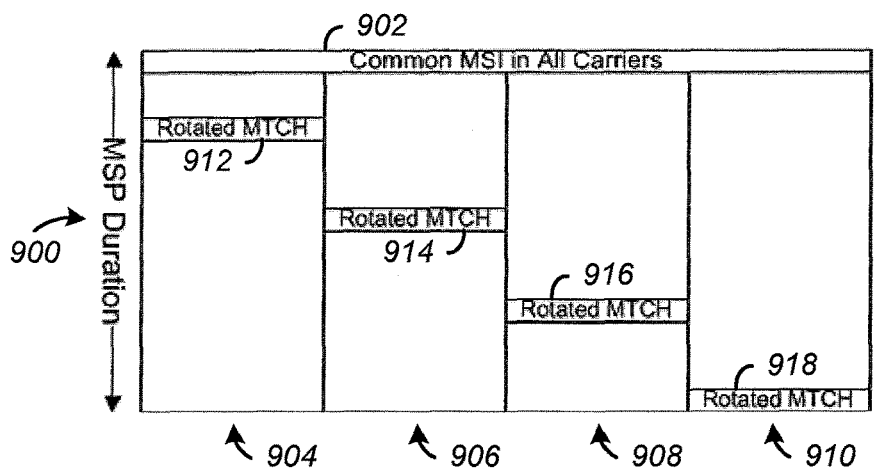
FIG. 9 is a graphical illustration depicting an organization of multiple carriers such that MSPs and respective MSIs thereof are aligned in time in accordance with one aspect of the present disclosure.

FIG. 9 depicts another organization of multiple carriers such that MSPs 900 and respective MSIs 902 thereof are aligned in time in accordance with one aspect of the present disclosure. With the MSPs 900 and MSIs 902 aligned in time across the carriers 904-910, all carriers may be described per carrier in a common MSI 902. Alternatively, the static time offset method described above may be employed using declared location of any, but preferably the first, MTCH within each carrier's MSP 900. With the MSPs aligned in time, an order of the MTCHs 912-918 may be rotated in order to permit the UE to access each of the MTCHs 912-918 within the aligned MSPs 900. With this approach, the organization of the MTCHs 912-918 may be a bit more complex, but the UE may read the MSI 902 only once globally per MSP 900 duration.

Figure 10:
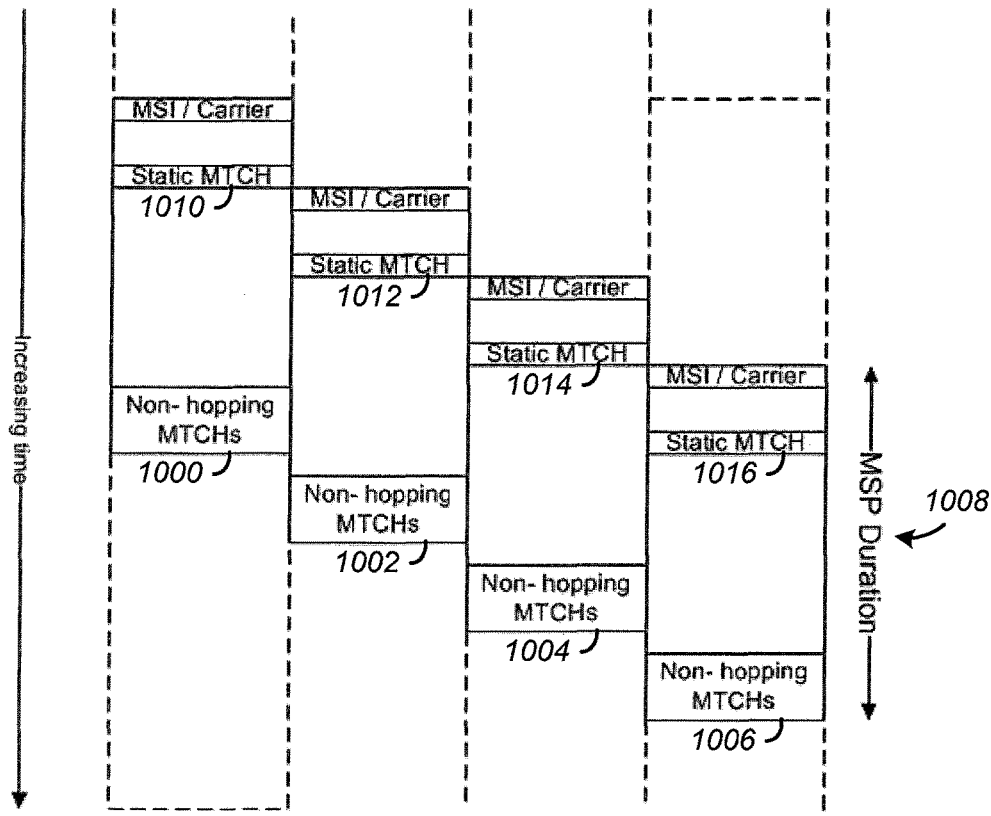
FIG. 10 is a graphical illustration depicting an organization of multiple carriers such that positions of non-hopping multicast transport channels (MTCHs) are fixed relative to positions of frequency hopping MTCHs in accordance with one aspect of the present disclosure.

FIG. 10 depicts an organization of multiple carriers such that positions of non-hopping multicast transport channels (MTCHs) 1000-1006 are fixed relative to positions of frequency hopping MTCHs 1010-1016 in accordance with one aspect of the present disclosure. For example, there may be file delivery services that have inherently long diversity on a single carrier, without the use of frequency hopping. For MSPs 1008 that are staggered in time, a collection of non-hopping MTCHs 1000-1006 within an MSP 1008 may be organized in terms of a sequence of MTCH(s) 1000-1006 to be static from one carrier to the next, but having absolute MSP time shifts on a per carrier basis. This organizational approach may result in the positions of the non-hopping MTCHs 1000-1006 being fixed relative to the frequency hopping MTCHs 1010-1016, and there may be some power savings for the non-hopping MTCHs.

Figure 11:
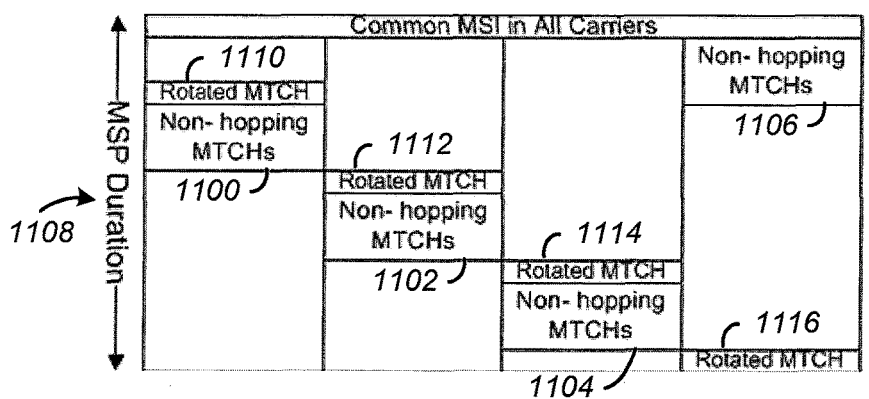
FIG. 11 is a graphical illustration depicting an organization of multiple carriers such that positions of non-hopping multicast transport channels (MTCHs) are fixed relative to positions of frequency hopping MTCHs in accordance with one aspect of the present disclosure.

FIG. 11 depicts another organization of multiple carriers such that positions of non-hopping multicast transport channels (MTCHs) 1100-1106 are fixed relative to positions of frequency hopping MTCHs 1110-1116 in accordance with one aspect of the present disclosure. For time aligned MSPs 1108, the sequence of an MTCH may shift, but the relative positions of the MSPs may remain aligned. As with the approach described above for the MSPs staggered in time, this time aligned approach may result in the positions of the non-hopping MTCHs 1100-1106 being fixed relative to the frequency hopping MTCHs 1110-1116, and there may be some power savings for the non-hopping MTCHs.

It is envisioned that a base station generating the RF signal may allocate a maximum access time to one or more MTCHs. In this context, the maximum accessible time that may be achieved may be that of a single carrier less the associated transition time among the N carriers. As the number of utilized carriers increases, maximum accessible time decreases slightly, ~10 ms per carrier. It is envisioned that this maximum access time may be allocated to one or multiple MTCHs.

It is also envisioned that a base station scheduling a collection of MTCHs may schedule the collection in such a manner that all of the MTCHs of the collection are concurrently accessible. One way to achieve this scheduling may be to make the MTCHS of the collection adjacent in time in the ordering of the MTCHs within the MSP. For the staggered MSPs, as detailed above with reference to FIG. 8 and FIG. 10, as long as maximum access time limitations are met, there may be no additional restrictions except that access in a current carrier may be constrained to end at least 10 ms before scheduling requires access on another carrier. For the time aligned MSPs, as detailed above with respect to FIG. 9 and FIG. 11, similar rules may be observed by the base station when scheduling the MTCHs. MSI access may always be supported.

Figure 12:
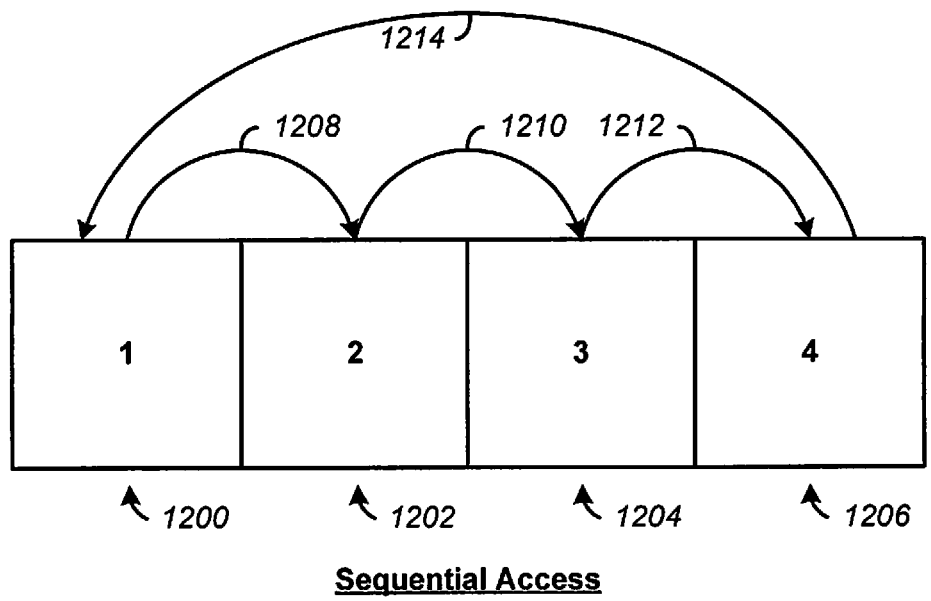
FIG. 12 is graphical illustration depicting sequential access of adjacent frequency segments according to one aspect of the present disclosure.

FIG. 12 depicts sequential access of adjacent frequency segments according to one aspect of the present disclosure. If the frequency segments 1200-1206 (i.e., carriers) are genuinely adjacent, there may be some slight correlation between adjacent frequency segments. Accordingly, there may exist some benefit to avoiding accessing the adjacent frequency segments 1200-1206 sequentially, as depicted in FIG. 12. For example, as depicted in FIG. 12, three sequential access steps 1208-1212, may be followed by one non-sequential access step 1214.

Figure 13:
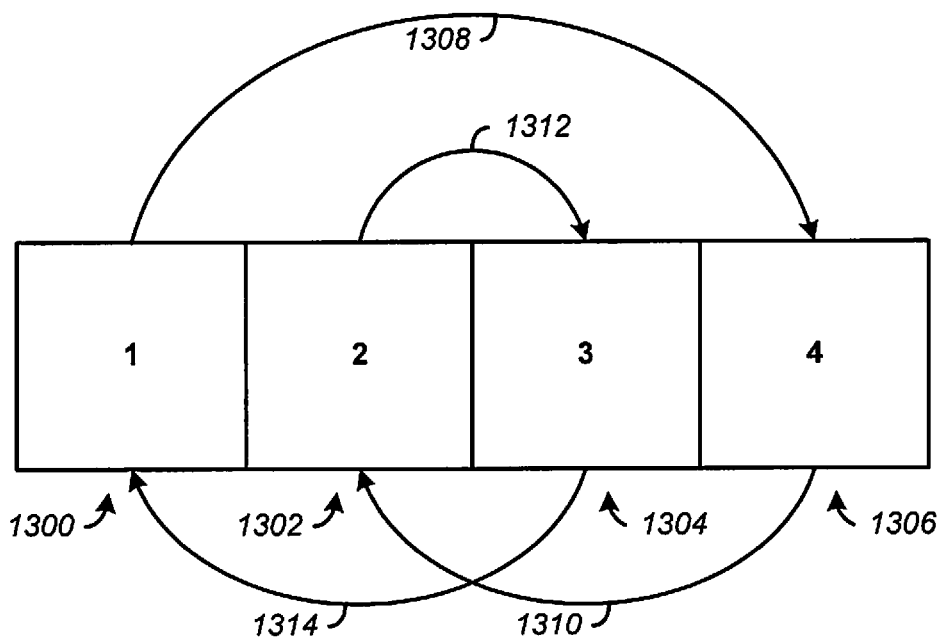
FIG. 13 is a graphical illustration depicting non-sequential access of adjacent frequency segments so as to reduce temporal correlation of adjacent frequencies by minimizing access of adjacent frequencies by a UE according to one aspect of the present disclosure.

FIG. 13 depicts non-sequential access of adjacent frequency segments so as to reduce temporal correlation of adjacent frequency segments 1300-1306 by minimizing access of adjacent frequencies by a UE according to one aspect of the present disclosure. For example, as depicted in FIG. 13, three non-sequential access steps 1308, 1310, and 1314 may be accomplished by implementing a single sequential access step 1312 following access step 1310 and preceding access step 1314. Therefore, while at least one adjacent access step may be unavoidable in some circumstances, such as in the cases of three and four frequency segments, it may still be possible to minimize the number of adjacent access steps by implementing non-sequential access steps as much as possible. This method may be extended to N carriers, where N is greater than three.

Figure 14:
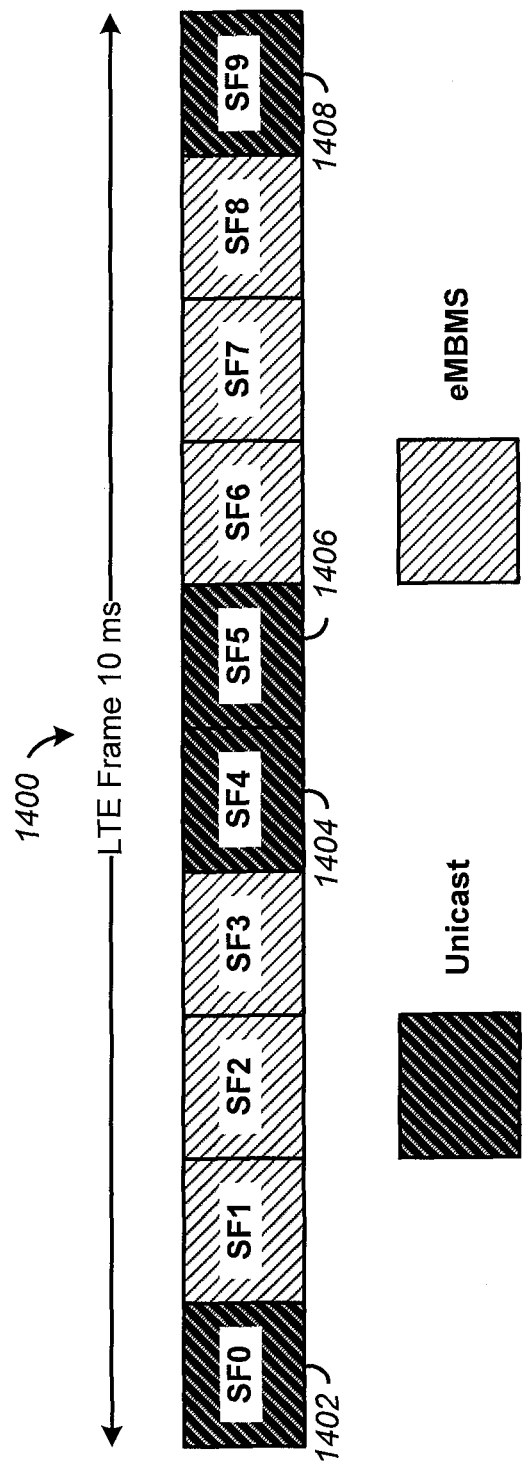
FIG. 14 is a graphical illustration depicting assignment of unicast traffic to frames containing broadcast subframes containing currently accessed broadcast services according to one aspect of the present disclosure.

FIG. 14 depicts assignment of unicast traffic to frames 1400 containing broadcast subframes containing currently accessed broadcast services according to one aspect of the present disclosure. This assignment accommodates the possibility that any one of the frequency segments may be the primary component carrier (PCC) assigned for a given UE. Such a circumstance may require that some subframes 1402-1408 be allocated to unicast (i.e., mixed mode operation). This sort of organization may be possible up to row 5 of Table 1, where symbol time is an integer fraction of a subframe. Given the required sequential access in these circumstances, it may make sense to have the unicast utilization follow the rules of the multicast access. Stated differently, the unicast traffic may be assigned to frames containing the broadcast subframes containing the currently accessed broadcast services. Alternatively, if one is willing to allocate two modem resources, then the PCC may be conventional unicast, and each of the eMBMS dedicated carriers may be a secondary component carrier (SCC), in an N+1 organization. It is envisioned that a single MTCH TMGI may be maintained across the group of carriers. Alternatively, it is envisioned that the MTCHs TMGIs may be unique per carrier and combine higher in the stack, but this approach may be less desirable due the need to have multiple TMGIs per service.

It is envisioned that a base station may implement various rules or constraints in scheduling the MTCHs. For example, there are a number of approaches to the scheduling that may all perform adequately as long as a single device modem resource never has to exceed total allowable reception time, $T_r$, calculated as follows:

$$T_r = (MSP - MSI) - N * \text{Transition Time per carrier,}$$

where N is number of carriers, MSP represents the MSP duration, and MSI represents the time required to read the MCH scheduling information. Additionally, there may be other restrictions relating to a base station scheduling collections of MTCHs.

For scheduling collections of MTCHs, a base station may observe additional rules or constraints. For example, the base station may ensure that a total elapsed time for a desired collection on any carrier does not exceed a threshold, $T_c$, calculated as follows:

$$T_c = (MSP - MSI)/N - \text{Transition Time,}$$

where N is the number of carriers, MSP represents the MSP duration, and MSI represents the time required to read the MCH scheduling information. The base station may also ensure that the total elapsed time for a desired collection on any carrier does not overlap itself in a collection sense on another carrier, including transition time.

It is envisioned that signaling of defined collections of related MTCHs may be desirable, as a base station may employ this information in order to form a successful schedule having temporal adjacency of MTCHs in a service. An example rule or constraint that may be employed by a base station for scheduling such MTCHs may be a requirement that all MTCHs in one service meet all the scheduling restrictions. Some rules employed by a base station in scheduling MTCHs may be simple, such as rules requiring that a service be a member of group numbers, such as group one, group three, group five, etc. In this context, each group may be concurrently accessible. In other words, the base station may enforce a rule or constraint that services in a common group be accessible by a single modem resource. It is envisioned that a base station may implement such a rule as a scheduling guarantee for a group of services. However, if multiple modem resources are available, then the base station may use a different scheduling rule to enable services across multiple groups.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
  receiving, by a user equipment (UE), a multiplexed multicarrier radio frequency (RF) signal having N carriers, wherein N is an integer greater than or equal to two; and
  accessing, by the UE, the N carriers by performing one carrier access per multicast channel (MCH) scheduling period (MSP) of time per carrier of the N carriers, thereby performing N accesses per MSP duration across the N carriers, wherein accessing the N carriers includes at least one of:
    concurrently accessing a collection of multicast transport channels (MTCHs), wherein the MTCHS of the collection are configured to be adjacent in time in an ordering of the MTCHs within the MSP,
    completing access on one of the N carriers at least a predefined amount of time before access on another of the N carriers,
    accessing adjacent frequency segments at least partly non-sequentially so as to reduce temporal correlation of adjacent frequencies by minimizing access of adjacent frequencies, utilizing a single MTCH temporary mobile group identifier (TMGI) across the N carriers;

utilizing MTCH TMGIs that are unique per carrier, and that are combined by one or more upper layers, or receiving MTCHs that are scheduled such that defined services are accessible by a single modem resource.

2. The method of claim 1, wherein the MSPs and respective MCH scheduling information (MSI) thereof are staggered in time across the N carriers so as to be asynchronous.

3. The method of claim 2, wherein an order of multicast transport channels (MTCHs) within each MSP is predetermined across the N carriers within respective MSP durations thereof, and wherein the accessing the N carriers includes inferring a resource of an MSI for one of the N carriers from another resource of another MSI for another of the N carriers based on a static time offset across the N carriers between resources of respective multicast transport channels (MTCHs) of the N carriers.

4. The method of claim 2, wherein positions of non-hopping multicast transport channels (MTCHs) are fixed relative to positions of frequency hopping MTCHs across the N carriers within the respective MSP durations thereof.

5. The method of claim 1, wherein the MSPs and respective MCH scheduling information (MSI) thereof are aligned in time across the N carriers so as to be synchronous.

6. The method of claim 5, wherein the accessing the N carriers includes at least one of:

obtaining a description of all of the N carriers per carrier in a common MSI; or inferring a resource of an MSI for one of the N carriers from another resource of another MSI for another of the N carriers based on a static time offset across the N carriers between resources of respective multicast transport channels (MTCHs) of the N carriers.

7. The method of claim 5, wherein an order of multicast transport channels (MTCHs) is rotated across the N carriers within a given MSP, and wherein positions of non-hopping multicast transport channels (MTCHs) are fixed relative to positions of frequency hopping MTCHs across the N carriers within respective MSPs thereof.

8. The method of claim 1, wherein accessing the N carriers includes concurrently accessing the collection of MTCHs, wherein the MTCHS of the collection are configured to be adjacent in time in the ordering of the MTCHs within the MSP.

9. The method of claim 1, wherein accessing the N carriers includes completing access on one of the N carriers at least a predefined amount of time before access on another of the N carriers.

10. The method of claim 1, wherein accessing the N carriers includes accessing adjacent frequency segments at least partly non-sequentially so as to reduce temporal correlation of adjacent frequencies by minimizing access of adjacent frequencies.

11. The method of claim 1, wherein accessing the N carriers includes utilizing the single MTCH TMGI across the N carriers.

12. The method of claim 1, wherein accessing the N carriers includes utilizing MTCH TMGIs that are unique per carrier, and that are combined by one or more upper layers.

13. The method of claim 1, wherein accessing the N carriers includes receiving MTCHs that are scheduled such that defined services are accessible by the single modem resource.

14. A method for wireless communication, the method comprising:

generating, by a base station, a multiplexed multicarrier radio frequency (RF) signal having N carriers organized to be accessed at a rate of one carrier access per multicast channel (MCH) scheduling period (MSP) of time per carrier of the N carriers, thereby requiring N accesses per MSP duration across the N carriers, wherein N is an integer greater than or equal to two, wherein generating the RF signal includes at least one of:

scheduling access of adjacent frequency segments to be at least partly non-sequential so as to reduce temporal correlation of adjacent frequencies by minimizing access of adjacent frequencies by the UE, maintaining a single multicast transport channel (MTCH) temporary mobile group identifier (TMGI) across the N carriers, maintaining MTCH TMGIs that are unique per carrier, and that are combined by one or more upper layers, scheduling the MSPs and respective MCH scheduling information (MSI) thereof according to a rule ensuring that a single device modem resource never has to exceed total allowable reception time, $T_r$, calculated according to:

$$T_r = (MSP - MSI) - N * \text{Transition Time per carrier},$$

where MSP represents duration of the MSP, and MSI represents time required to read the MCH scheduling information, scheduling multicast transport channels (MTCHs) during the MSPs and respective MCH scheduling information (MSI) thereof according to a rule ensuring that total elapsed time for a desired collection of MTCHs on any of the N carriers does not exceed a threshold, $T_c$, calculated as follows:

$$T_c = (MSP - MSI)/N - \text{Transition Time},$$

where MSP represents duration of the MSP, and MSI represents time required to read the MCH scheduling information, the rule further ensuring that the total elapsed time does not overlap itself in a collection sense on another of the N carriers, including the transition time, scheduling MTCHs such that defined services are accessible by a single modem resource, or scheduling MTCHs according to a minimum requirement that all MTCHs in one service meet all scheduling restrictions; and transmitting, by the base station, the RF signal to a user equipment (UE).

15. The method of claim 14, wherein generating the RF signal includes organizing the N carriers such that the MSPs and respective MCH scheduling information (MSI) thereof are staggered in time so as to be asynchronous.

16. The method of claim 15, wherein organizing the N carriers includes one of:

organizing the N carriers such that an order of multicast transport channels (MTCHs) within each MSP is predetermined within respective MSP durations thereof;

organizing the N carriers such that a resource of an MSI for one of the N carriers may be inferred from another resource of another MSI for another of the N carriers by enforcing scheduling rules based on a static time offset across the N carriers between resources of respective MTCHs of the N carriers; and organizing the N carriers such that positions of non-hopping MTCHs are fixed relative to positions of frequency hopping MTCHs within the respective MSP durations thereof.

17. The method of claim 14, wherein generating the RF signal includes organizing the N carriers such that the MSPs and respective MCH scheduling information (MSI) thereof are aligned in time so as to be synchronous.

18. The method of claim 17, wherein generating the RF signal includes describing all of the N carriers per carrier in a common MSI, and wherein organizing the N carriers includes at least one of:
  organizing the N carriers such that a resource of an MSI for one of the N carriers may be inferred from another resource of another MSI for another of the N carriers by enforcing scheduling rules based on a static time offset across the N carriers between resources of respective MTCHs of the N carriers;
  rotating an order of MTCHs within a given MSP; or
  organizing the N carriers such that positions of non-hopping MTCHs are fixed relative to positions of frequency hopping MTCHs within respective MSPs thereof.

19. The method of claim 14,
  wherein generating the RF signal includes at least one of:
    allocating a maximum access time to one or more multicast transport channels (MTCHs); or
    scheduling a collection of MTCHs to be adjacent in time in an ordering of the MTCHs within the MSP to all be concurrently accessible; and
  wherein scheduling the collection of MTCHS includes at least one of:
    scheduling the MTCHs to be adjacent in time in an ordering of the MTCHs within an MSP; or
    scheduling the collection of MTCHs such that access on one of the N carriers ends a predefined amount of time before the scheduling requires access on another of the N carriers.

20. A non-transitory computer-readable medium having program code recorded thereon, the program code comprising:
  program code for causing a computer to receive, by a user equipment (UE), a multiplexed multicarrier radio frequency (RF) signal having N carriers, wherein N is an integer greater than or equal to two; and
  program code for causing the computer to access, by the UE, the N carriers by performing one carrier access per multicast channel (MCH) scheduling period (MSP) of time per carrier of the N carriers, thereby performing N accesses per MSP duration across the N carriers, wherein the program code for causing the computer to access the N carriers includes at least one of:
    program code for causing the computer to concurrently access a collection of multicast transport channels (MTCHs), wherein the MTCHS of the collection are configured to be adjacent in time in the ordering of the MTCHs within the MSP,
    program code for causing the computer to complete access on one of the N carriers at least a predefined amount of time before access on another of the N carriers,
    program code for causing the computer to access adjacent frequency segments at least partly non-sequentially so as to reduce temporal correlation of adjacent frequencies by minimizing access of adjacent frequencies,
    program code for causing the computer to utilize a single MTCH temporary mobile group identifier (TMGI) across the N carriers,
    program code for causing the computer to utilize MTCH TMGIs that are unique per carrier, and that are combined by one or more upper layers, or
    program code for causing the computer to receive MTCHs that are scheduled such that defined services are accessible by a single modem resource.

21. The non-transitory computer-readable medium of claim 20, wherein the MSPs and respective MCH scheduling information (MSI) thereof are staggered in time across the N carriers so as to be asynchronous.

22. The non-transitory computer-readable medium of claim 21,
  wherein an order of multicast transport channels (MTCHs) within each MSP is predetermined across the N carriers within respective MSP durations thereof,
  wherein the program code for causing the computer to access the N carriers includes program code for causing the computer to infer a resource of an MSI for one of the N carriers from another resource of another MSI for another of the N carriers based on a static time offset across the N carriers between resources of respective multicast transport channels (MTCHs) of the N carriers, and
  wherein positions of non-hopping MTCHs are fixed relative to positions of frequency hopping MTCHs across the N carriers within the respective MSP durations thereof.

23. A user equipment (UE), the UE comprising:
  at least one processor; and
  a memory coupled to said at least one processor,
  wherein said at least one processor is configured to:
    receive, by a user equipment (UE), a multiplexed multicarrier radio frequency (RF) signal having N carriers, wherein N is an integer greater than or equal to two; and
    access, by the UE, the N carriers by performing one carrier access per multicast channel (MCH) scheduling period (MSP) of time per carrier of the N carriers, thereby performing N accesses per MSP duration across the N carriers, wherein the configuration of the at least one processor to access the N carriers includes configuration of the at least one processor to at least one of:
      concurrently access a collection of multicast transport channels (MTCHs), wherein the MTCHS of the collection are configured to be adjacent in time in the ordering of the MTCHs within the MSP,
      complete access on one of the N carriers at least a predefined amount of time before access on another of the N carriers,
      access adjacent frequency segments at least partly non-sequentially so as to reduce temporal correlation of adjacent frequencies by minimizing access of adjacent frequencies,
      utilize a single MTCH temporary mobile group identifier (TMGI) across the N carriers,
      utilize MTCH TMGIs that are unique per carrier, and that are combined by one or more upper layers, or
      receive MTCHs that are scheduled such that defined services are accessible by a single modem resource.

24. The UE of claim 23, wherein the MSPs and respective MCH scheduled information (MSI) thereof are staggered across the N carriers so as to be asynchronous.

25. The UE claim of 24, wherein an order of multicast transport channels (MTCHs) within each MSP is predetermined across the end carriers within respective MSP durations thereof, and wherein the configuration of the at least one processor to access the N carriers includes configuration to infer a resource of an MSI for one of the N carriers from another resource of another MSI for another of the N carriers based on a static time offset across the N carriers between resources of respective multicast transport channels (MTCHs) of the N carriers.

26. The UE claim of 24, wherein positions of non-hopping MTCHs across the N channels (MTCHs) are fixed relative to positions of frequency hopping MTCHs across the N carriers within the respective MSP durations thereof.

27. The UE of claim 23, wherein the MSPs and respective MCH scheduling information (MSI) thereof are aligned in time across the N carriers so as to be synchronous.

28. The UE of claim 27, wherein the configuration of the at least one processor to access the N carriers includes configuration of the at least one processor to at least one of:
- obtain a description of all of the N carriers per carrier in a common MSI; or
- infer a resource of an MSI for one of the N carriers from another resource of another MSI for another of the N carriers based on a static time offset across the N carriers between resources of respective multicast transport channels (MTCHs) of the N carriers.

29. The UE of claim 27, wherein an order of multicast transport channels (MTCHs) is rotated across the N carriers within a given MSP, and wherein positions of non-hopping multicast transport channels (MTCHs) are fixed relative to positions of frequency hopping MTCHs across the N carriers within respective MSPs thereof.

* * * * *